(12) United States Patent
Jung et al.

(10) Patent No.: US 11,808,942 B2
(45) Date of Patent: Nov. 7, 2023

(54) ELECTRONIC DEVICE CAPABLE OF PROVIDING MULTIPLE FOCAL POINTS FOR LIGHT OUTPUTTED FROM DISPLAY

(71) Applicant: SAMSUNG ELECTRONICS CO., LTD., Suwon-si (KR)

(72) Inventors: Hoyoung Jung, Suwon-si (KR); Nari Kim, Suwon-si (KR); Sehoon Kim, Suwon-si (KR); Wonhee Choe, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 460 days.

(21) Appl. No.: 17/261,733

(22) PCT Filed: Jul. 23, 2019

(86) PCT No.: PCT/KR2019/009102
§ 371 (c)(1),
(2) Date: Jan. 20, 2021

(87) PCT Pub. No.: WO2020/022750
PCT Pub. Date: Jan. 30, 2020

(65) Prior Publication Data
US 2021/0271087 A1    Sep. 2, 2021

(30) Foreign Application Priority Data
Jul. 23, 2018  (KR) ........................ 10-2018-0085604

(51) Int. Cl.
*G02B 27/01* (2006.01)
*G02B 27/28* (2006.01)
*G02B 30/25* (2020.01)

(52) U.S. Cl.
CPC ....... *G02B 27/0172* (2013.01); *G02B 27/283* (2013.01); *G02B 30/25* (2020.01)

(58) Field of Classification Search
CPC ... G02B 27/0172; G02B 30/25; G02B 27/283
(Continued)

(56) References Cited

U.S. PATENT DOCUMENTS 9,946,393 B2   4/2018   Kim et al.
10,228,570 B2  3/2019   Mans et al.
(Continued)

FOREIGN PATENT DOCUMENTS

JP   2017-500605   1/2017
KR   10-2006-0115733   11/2006
(Continued)

OTHER PUBLICATIONS

International Search Report for PCT/KR2019/009102 dated Nov. 8, 2019, 19 pages.
(Continued)

*Primary Examiner* — Wyatt A Stoffa
*Assistant Examiner* — Grant A Gagnon
(74) *Attorney, Agent, or Firm* — Nixon & Vanderhye, P.C.

(57) ABSTRACT

An electronic device according to various embodiments comprises: a display including a plurality of pixels; a first polarizing plate arranged on a first area of the display and capable of rotating, in a first rotational direction, a first light outputted through one or more first pixels included in the first area; a second polarizing plate arranged on a second area of the display and capable of rotating, in a second rotational direction, a second light outputted through one or more second pixels included in the second area; a first mirror arranged to have a first designated incline on the first area and capable of reflecting the first light rotating in the first rotational direction; a second mirror arranged to have a second designated incline on the second area and capable of reflecting at least a part of the second light rotating in the second rotational direction; and a flat lens capable of transmitting a first reflective light obtained by allowing the first light rotating in the first rotational direction to be reflected through the first mirror, and a second reflective light obtained by allowing the second light rotating in the second rotational direction to be reflected through the second mirror, wherein the flat lens forms a first focal point at a location of the first reflective light before the first reflective light passes through the flat lens, and forms a second focal point at a location of the second reflective light after the second reflective light passes through the flat lens.

15 Claims, 18 Drawing Sheets

(58) Field of Classification Search
USPC .......................................................... 359/630
See application file for complete search history.

(56) References Cited

U.S. PATENT DOCUMENTS

| | | |
|---|---|---|
| 10,866,417 B2 | 12/2020 | Sung et al. |
| 2006/0239171 A1 | 10/2006 | Ooi et al. |
| 2010/0085453 A1 | 4/2010 | Oh et al. |
| 2015/0205126 A1 | 7/2015 | Schowengerdt |
| 2016/0047956 A1 | 2/2016 | Tabirian et al. |
| 2018/0180889 A1 | 6/2018 | Lee et al. |

FOREIGN PATENT DOCUMENTS

| | | |
|---|---|---|
| KR | 10-2010-0039170 | 4/2010 |
| KR | 10-2013-0124744 | 11/2013 |
| KR | 10-2016-0024168 | 3/2016 |
| KR | 10-2018-0010174 | 1/2018 |
| KR | 10-2018-0043072 | 4/2018 |
| KR | 10-2018-0074940 | 7/2018 |

OTHER PUBLICATIONS

Written Opinion of the ISA for PCT/KR2019/009102 dated Nov. 8, 2019, 3 pages.
Office Action dated Jan. 26, 2023 in Korean Application No. 10-2018-0085604 and English-language translation.

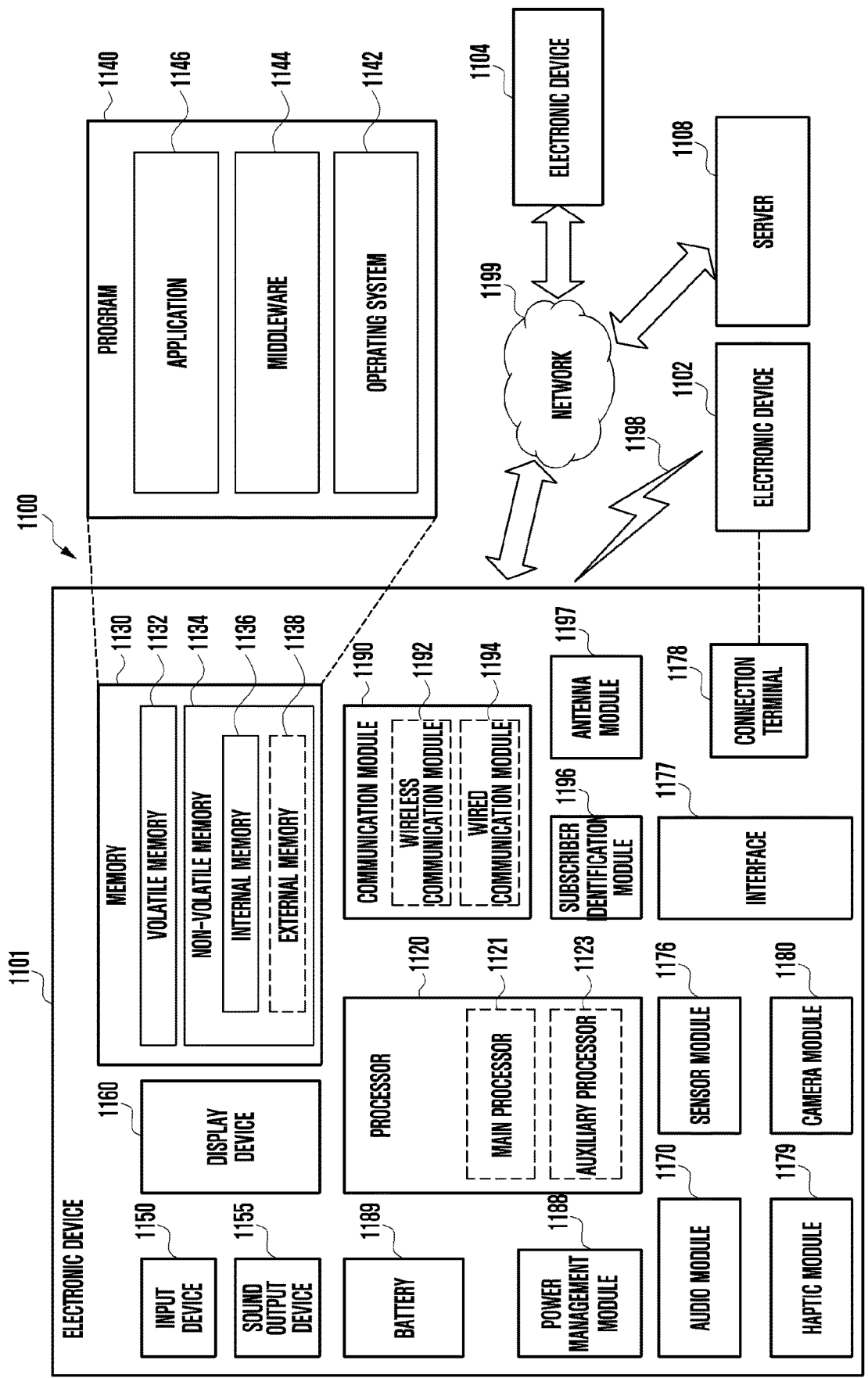

ELECTRONIC DEVICE CAPABLE OF PROVIDING MULTIPLE FOCAL POINTS FOR LIGHT OUTPUTTED FROM DISPLAY

This application is the U.S. national phase of International Application No. PCT/KR2019/009102 filed Jul. 23, 2019 which designated the U.S. and claims priority to KR Patent Application No. 10-2018-0085604 filed Jul. 23, 2018, the entire contents of each of which are hereby incorporated by reference.

BACKGROUND

Field

The disclosure relates to an electronic device, and for example, relates to an electronic device having an optical configuration capable of expressing an image with multiple focuses.

Description of the Related Art

Electronic devices configured to provide virtual reality and/or augmented reality are provided. Such a VR/AR device may be directly worn by a user, as in the case of a head-mounted display device, such that images are expressed near the user's both eyes, thereby providing VR/AR.

In order to implement VR/AR, it is necessary to express an image including various objects. In order to provide the user with a higher level of realistic feelings, it is necessary to focus the reflection of various objects in a desired position.

SUMMARY

A VR/AR device (for example, a head-mounted display device) may express an image with a single focus. In this case, reflections of all objects are recognized in a single position, and the user fails to have the intended stereoscopic feelings.

It is an aspect of various embodiments disclosed herein to provide an optical structure capable of multi-focus expression in connection with an electronic device configured to implement virtual reality/augmented reality.

An electronic device according to various embodiments may include: a display including a plurality of pixels; a first polarizer disposed on a first area of the display and configured to rotate a first light output through one or more first pixels pertaining to the first area in a first rotational direction; a second polarizer disposed on a second area of the display and configured to rotate a second light output through one or more second pixels pertaining to the second area in a second rotational direction; a first mirror disposed on the first area at a first inclination and configured to reflect the first light that rotates in the first rotational direction; a second mirror disposed on the second area at a second inclination and configured to reflect at least a portion of the second light that rotates in the second rotational direction; and a flat lens configured to transmit a first reflected light obtained by reflecting the first light that rotates in the first rotational direction, on the first mirror, and a second reflected light obtained by reflecting the second light that rotates in the second rotational direction, on the second mirror. The flat lens may form a first focus corresponding to the first reflected light at a location before the first reflected light passes through the flat lens, and may form a second focus corresponding to the second reflected light at a location after the second reflected light passes through the flat lens.

An electronic device according to various embodiments may include: an accommodation part accommodating an external electronic device; a first polarizer disposed on a first area of the external electronic device and configured to rotate a first light output through one or more first pixels pertaining to the first area in a first direction; a second polarizer disposed on a second area of the external electronic device and configured to rotate a second light output through one or more second pixels pertaining to the second area in a second direction; a first mirror disposed on the first area at a first inclination and configured to reflect the first light that rotates in the first direction; a second mirror disposed on the second area at a second inclination and configured to reflect the second light that rotates in the second direction; and a flat lens configured to transmit a first reflected light obtained by reflecting the first light that rotates in the first direction, on the first mirror, and a second reflected light obtained by reflecting the second light that rotates in the second direction, on the second mirror. The flat lens may form a first focus corresponding to the first reflected light at a location after the first reflected light passes through the flat lens, and may form a second focus corresponding to the second reflected light at a location before the second reflected light passes through the flat lens.

According to various embodiments disclosed herein, an electronic device configured to implement virtual reality/augmented reality, which is capable of multi-focus expression, may be provided. Moreover, the electronic device according to various embodiments may form a multi-focus reflection at a short distance according to a mechanical structure without problems related to noise, vibration, current consumption, and the like.

BRIEF DESCRIPTION OF THE DRAWINGS

FIG. 11 illustrates a block diagram of an electronic device that may provide multiple focuses for light output from a display, in a network environment, according to various embodiments.

DETAILED DESCRIPTION

Figure 1:
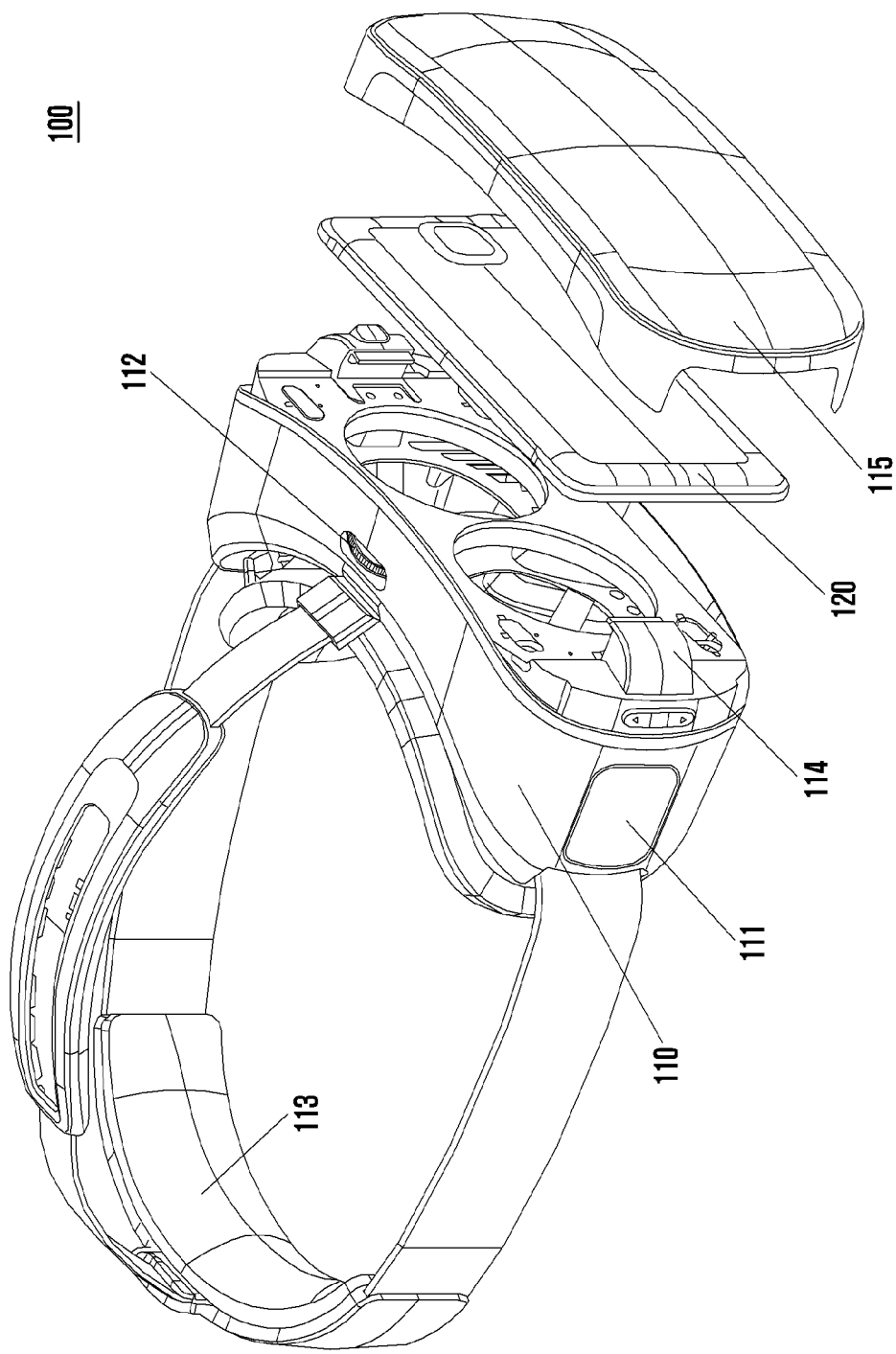
FIG. 1 is a diagram of a structure of an electronic device according to various embodiments.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

FIG. 1 is a diagram of a configuration of an electronic device according to various embodiments.

Referring to FIG. 1, an electronic device according to various embodiments may include a frame 110, a touchpad 111, a positioner 112, a mount 113, a connector 114, and a cover 115.

According to various embodiments, the frame 110 may include a space or a structure for receiving an external electronic device 150. The external electronic device 150 may be configured to be detachably mounted on the frame 110. The frame 110 may include one or more display positioners 112 or lens adjustors (not illustrated) on an outer surface of the frame 110.

Figure 2:
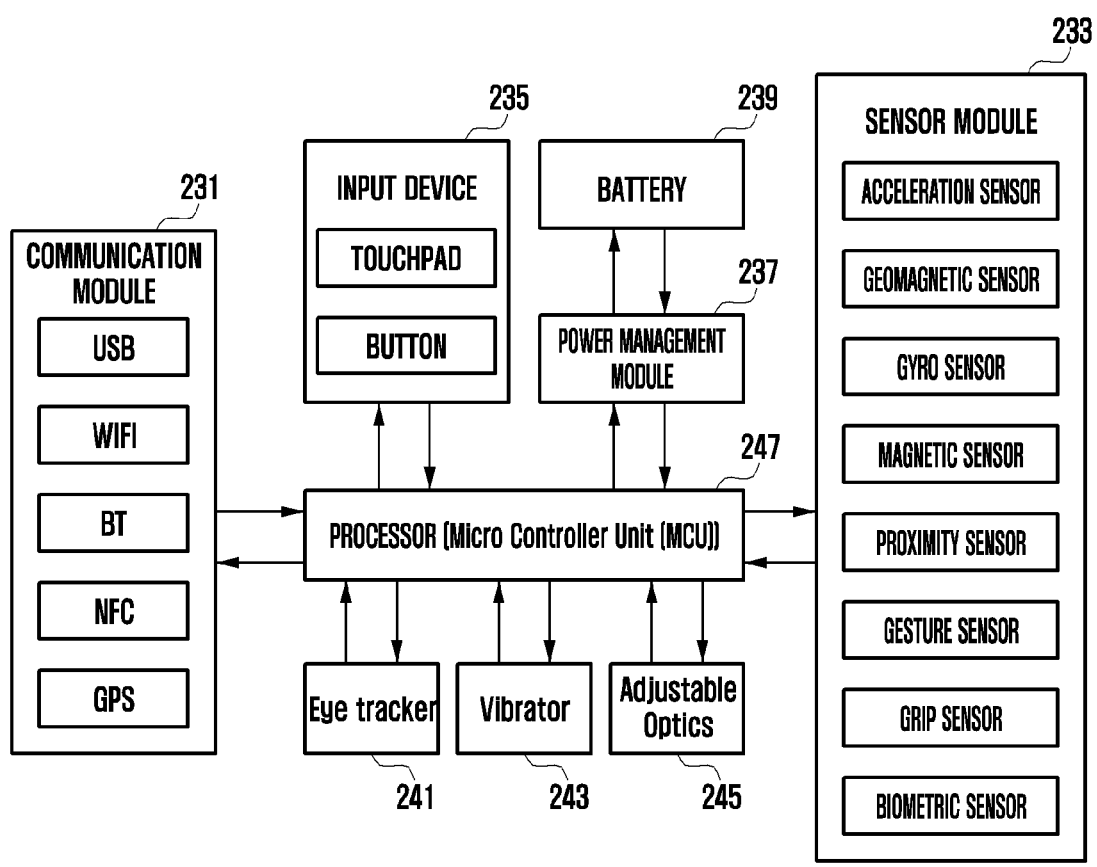
FIG. 2 is a block diagram of an electronic device according to various embodiments.

Although FIGS. 1 and 2 illustrate a structure, by which the external electronic device 150 may be inserted into the frame 110, according to other embodiments, the electronic device may not include a receiving space and/or structure for the external electronic device 150. A display (not illustrated) integrally mounted on the frame 110 may be included at the corresponding location. That is, the electronic device may use a display of the external electronic device 150 or a display integrally mounted in the frame, as a display that outputs image information.

According to various embodiment, the display positioner 112 may have a form of a wheel or a dial. If a user turns a wheel or a dial realized as a display positioner 112, a display (e.g., the integral display or the display of the external electronic device 150) mounted on the frame 110 may be moved such that a distance between the display and the user may be adjusted. In other words, the user may adjust the location of the display by using the display positioner 112 such that an image that is suitable for his or her sight vision or displayed optimally may be watched.

According to various embodiments, the frame 110 may include an input unit (e.g., the touchpad 111) for controlling the electronic device or the external electronic device 150 on a side surface thereof. For example, the input unit may include at least one of a physical key, a physical button, a touch key, a joy stick, a wheel key, or a touchpad.

According to various embodiments, the touchpad 111 may receive a touch input of the user, for example, an input made by directly touching the touchpad 111 or a hovering input. The external electronic device 150 and the frame 110 may be connected to each other by using an interface such as a universal serial bus (USB) to transmit a touch input signal detected through the touchpad 111 to the external electronic device 150. The external electronic device 150 may perform a function corresponding to a touch input received from the touchpad 111 of the electronic device, in response to the touch input.

According to various embodiments, the mount 113 may be connected to the frame 110 such that the frame 110 may be fixed to a portion (e.g., a portion around an eye of the face of the user) of the body of a person. The mount 113 may include a band formed of an elastic material, and may include eyeglass temples, a helmet, or straps.

According to various embodiments, the frame 110 may include a connector 114 that is electrically connected to an electric connector of the external electronic device 150 to allow communication with the external electronic device 150. The connector 114 may include a USB connector that may be electrically connected to the electric connector of the external electronic device 150, for example, a USB port. The electronic device may transmit a signal of a graphic user interface through the electric connector of the USB connector.

According to various embodiments, the electronic device may further include a cover 115 coupled such that the external electronic device 150 may be supported by the frame 110 more firmly in a state in which the external electronic device 150 is coupled to the frame 110. The cover 115 may be physically coupled to the frame 110 in the form of a hook or in a manner using, for example, a magnet or an electromagnet. The cover 115 may prevent the external electronic device 150 from being separated from the frame 110.

According to various embodiments, the display may be mounted on the frame 110. The display may be integrally attached to the frame 110, and may be detachably mounted on the frame 110. The display may be a flexible display.

FIG. 2 is a block diagram of an electronic device according to various embodiments.

Referring to FIG. 2, an electronic device 200 according to various embodiment may include a communication module 231, a sensor module 233, an input device 235, a power management module 237, a battery 239, an eye tracker 241, a vibrator 143, a focuser (adjustable optics) 245, a lens assembly (not illustrated), and a processor (or a micro controller unit (MCU)) 247.

Although not illustrated in FIG. 2, the electronic device 200 may further include other constituent elements, for example, a display module. According to various embodiments, some of the constituent elements, which are not illustrated in FIG. 2, may be included in a frame (e.g., the frame 110 of FIG. 1) of the electronic device 200, and some of the other constituent elements may be included in an external electronic device (e.g., the external electronic device 150 of FIG. 1) that is detachably mounted in the frame (e.g., the frame 110 of FIG. 1).

According to various embodiments, the communication module 231 may electrically connect the frame of the electronic device 200 and the external electronic device through wired and/or wireless communication to transmit and receive data. The communication module 231 may include a USB module, a wireless fidelity (Wi-Fi) module, a Bluetooth (BT) module, a near field communication (NFC) module, and a global positioning system (GPS) module. According to other embodiments, at least some (e.g., two or more) of the Wi-Fi module, the BT module, the GPS module, or the NFC module may be included in one integrated chip (IC) or IC package.

According to various embodiments, the sensor module 233 may measure a physical quantity or sense an operating state of the electronic device 200, and may convert the measured or sensed information into an electric signal. The sensor module 233, for example, may include at least one of an acceleration sensor, a geomagnetic sensor, a gyro sensor, a magnetic sensor, a proximity sensor, a gesture sensor, a grip sensor, or a biometric sensor. The sensor module 233 may further include a control circuit (not illustrated) for controlling one or more sensors included therein.

According to various embodiments, the electronic device 200 may detect a mounting state of the external electronic device by using a proximity sensor or a grip sensor. Whether the external electronic device is mounted may be determined by detecting at least one of IR recognition, pressure recognition, or a change in capacitance (or permittivity) according to the mounting of the external electronic device. Further, the electronic device 200 may detect motion of the head of the user who wears the electronic device 200 by using the acceleration sensor, the geomagnetic sensor, or the gyro sensor.

According to various embodiments, at least some constituent elements of the sensor module 233 may be included in the external electronic device that is detachably mounted in the frame.

According to various embodiments, the gesture sensor may detect a motion of a hand or a finger of the user and detect the detected motion as a control input for the electronic device 200. The biometric sensor, for example, may include an E-nose sensor, an electromyography (EMG) sensor, an electroencephalogram (EEG) sensor, an electrocardiogram (ECG) sensor, or an iris sensor, and the electronic device 200 may recognize biometric information of the user by using the biometric sensor.

According to various embodiments, the input device 235 may include a touchpad or a button. The touchpad, for example, may recognize a touch input through at least one of capacitive, resistive, infrared ray type, or ultrasonic wave type schemes. Further, the touchpad may further include a control circuit (not illustrated).

According to various embodiments, the power management module 237 may perform a function of supplying electric power for using the electronic device 200. The battery 239 may store or generate electricity and may supply electric power to the electronic device 200 by using the stored or generated electricity. The battery 239 may be included at a portion of the frame of the electronic device 200. In addition, the battery 239 may be functionally connected to the external electronic device that is detachably mounted in the frame.

According to various embodiments, the eye tracker 241, for example, may track an eye of the user by using at least one of an electrical oculography (EOG) sensor, a coil system, a dual Purkinje system, a bright pupil system, or a dark pupil system. The eye tracker 241 may further include a micro camera for tracking an eye of the user.

According to various embodiments, the vibrator 143 may convert an electrical signal to mechanical vibration.

The focuser 145 may measure an inter-pupil distance (IPD) of the user such that the user may watch an image that is suitable for his or her eye sight to adjust a distance of the lens and a location of the display (e.g., the integral display or the display of the external electronic device).

According to various embodiments, the processor 247 may control a plurality of hardware elements connected to the processor 247 by driving an operating system (OS) or embedded S/W programs.

Figure 3:
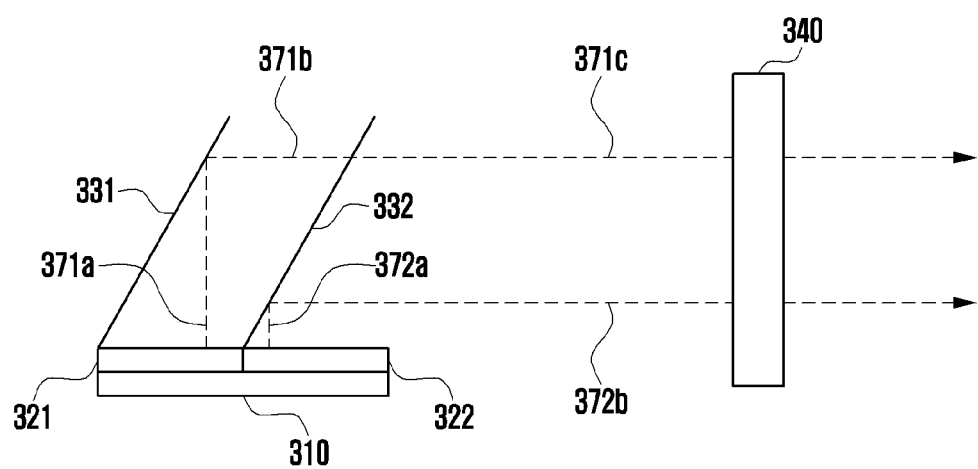
FIG. 3 illustrates an optical path of light output from a display, in an electronic device according to various embodiments.

FIG. 3 illustrates an optical path of light output from a display, in an electronic device according to various embodiments. Hereinafter, the rightward direction in the drawings is defined as a first direction and the upward direction is defined as a second direction, for convenience of description.

According to various embodiments, the electronic device may be realized as a head mounted display device. FIG. 3 illustrates structural features for allowing light output from a display (or the display of the external electronic device) of an electronic device to be recognized by an eye of the user, and the detailed hardware and/or software configuration of the electronic device has been described through the electronic device 100 of FIG. 1 and the electronic device 200 of FIG. 2.

According to various embodiments, the electronic device may include a display 310. The display may be realized by any one of a liquid crystal display (LCD), a light emitting diode (LED) display, an organic light emitting diode (OLED) display, a micro electro mechanical system (MEMS) display, or an electronic paper display, but the disclosure is not limited thereto. The display 310 may include a plurality of pixels, and may provide an image (e.g., an object of a virtual reality or an augmented reality) according to light output from a plurality of pixels.

According to various embodiments, the electronic device may include an insertion part (not illustrated), into which an external electronic device (e.g., the external electronic device 150 of FIG. 1) may be inserted. The insertion part may be disposed in the frame (e.g., the frame 110 of FIG. 1) of the electronic device, and the external electronic device may be detachably mounted on the frame. If the external electronic device is inserted, the display of the external electronic device may be disposed at the location of the display 310 of FIG. 3, and in the present embodiment, the electronic device may not include the display 310.

The display 310 or the display of the external electronic device may be disposed in a direction that is substantially perpendicular to a path (or the first direction) along which the light (or the reflected light) is input to the flat lens 340 to output the light in the second direction.

According to various embodiments, the electronic device may include a plurality of polarizers 321 and 322 disposed on the display 310. Although FIG. 3 illustrates that the first polarizer 321 and the second polarizer 322 are disposed, the disclosure is not limited thereto, and three polarizers (e.g., a first polarizer 921, a second polarizer 922, and a third polarizer 933 of FIG. 9) may be disposed or four or more polarizers may be disposed.

Referring to FIG. 3, the first polarizer 321 may be disposed on a first area of the display 310, and the second polarizer 322 may be disposed on a second area of the display 310. The first polarizer 321 and the second polarizer 322 may be disposed in parallel to the display 310, may directly contact the display 310, or may be attached to the display 310 by using an adhesive member (not illustrated).

Light output from a first pixel area, in the plurality of pixels of the display 310, may pass through the first polarizer 321, and light output from a second pixel area of the display 310 may pass through the second polarizer 322. The first pixel area and the second pixel area are divided into half the pixels of the display 310, respectively, and the first polarizer 321 and the second polarizer 322 may have the same size to cover substantially half the entire pixel area of the display 310, respectively, but the disclosure is not limited thereto, and the size of any one of the first pixel area (or the first polarizer 321) and the second pixel area (or the second polarizer 322) may be larger. Further, neither the first polarizer 321 nor the second polarizer 322 may be disposed on a partial area (e.g., a periphery) of the pixels of the display 310.

According to various embodiments, the first pixel area and the second pixel area of the display 310 may output information on different images (e.g., objects). As will be described below, because the image information output from the first pixel area and the image information output from the second pixel area correspond to different focuses, the user may have different perspectives for the respective pieces of image information.

According to various embodiments, the first polarizer 321 may rotate a first light 371a output from the first pixel area of the display 310 in a first rotational direction. In addition, the second polarizer 322 may rotate a second light 372a output from the second pixel area of the display 310 in a second rotational direction. Accordingly, the first light 371a that passed through the first polarizer 321 and the second light 372a that passed through the second polarizer 322 may be converted to circularly polarized lights. The first rotational direction and the second rotational direction may be opposite directions, that is, the left circular direction and the right circular direction, but may be opposite. Hereinafter, it will be described that the first light 371a passes through the first polarizer 321 and becomes a left circular polarized light, and the second light 372a passes through the second polarizer 322 and becomes a left circular polarized light. When the first light 371a and the second light 372a pass through the first polarizer 321 and the second polarizer 322, only a circularly polarized light in one direction passes, and thus only a portion of the quantities of the first light 371a and the second light 372a may pass.

According to various embodiments, a first mirror 331 may be disposed on the first polarizer 321. The first mirror 331 may contact the first polarizer 321 at an end of the first polarizer 321 (e.g., a corner of the first polarizer 321, which is far from the flat lens 340), and may be disposed at a first inclination with respect to the first polarizer 321. Further, a second mirror 332 may be disposed on the second polarizer 322. The second mirror 332 may contact the second polarizer 322 at an end of the second polarizer 322 (e.g., a corner of the second polarizer 322, which is far from the flat lens 340), and may be disposed at a second inclination with respect to the second polarizer 322. Referring to FIG. 3, the first mirror 331 may be disposed in a direction that is farther from the flat lens 340 than the second mirror 332.

According to various embodiments, the first inclination and the second inclination may be substantially the same. For example, the first inclination and the second inclination may be about 45 degrees. Accordingly, the first light 371a that passed through the first polarizer 321 and the second light 372a that passes through the second polarizer 322 may be reflected by the first mirror 331 and the second mirror 332, and the travel directions thereof may be changed to a vertical direction (e.g., the first direction). Hereinafter, the first light 371a reflected by the first mirror 331 is defined as a first reflected light 371b, and the second light 372a reflected by the second mirror 332 is defined as a second reflected light 372b.

According to various embodiments, the first mirror 331 may reflect the first light 371a substantially totally. Accordingly, the substantially total first light 371a is the first reflected light 371b, and may be input to a second surface (e.g., a surface that is opposite to the surface of the second mirror 332, which faces the second polarizer 322) of the second mirror 332. As the first light 371a is reflected by the first mirror 331, the rotational direction of the first reflected light 371b may be changed from the first rotational direction (e.g., the left circular direction) of the first light 371a to the second rotational direction (e.g., the right circular direction).

According to various embodiments, the second mirror 332 may be realized by a half mirror or a beam splitter that transmits a portion of the light and reflects the remaining portions of the light. Accordingly, even though the second mirror 332 is disposed in a travel path of the first direction of the first reflected light 371b, it may also transmit the first reflected light 371b while changing the travel direction of the second light 372a (e.g., the second reflected light 372b). In more detail, a portion 371c (e.g., about 50%) of the first reflected light input through the first surface of the second mirror 332 may be reflected to an opposite direction (or the second direction) to the second polarizer 322, and the remaining portions (e.g., about 50%) may directly pass through the second mirror 332. In addition, a portion (e.g., about 50%) of the second light 372a input through the first surface (e.g., the surface of the second mirror 332, which faces the second polarizer 322) of the second mirror 332 may be reflected as the second reflected light 372b in the first direction by the second mirror 332, and the remaining portions (e.g., about 50%) may pass through the second mirror 332 and face the second direction. The transmittance and reflectivity of the second mirror 332 may be 50%, respectively, but any one may be larger.

Because the first reflected light 371b passes through the second mirror 332, the rotational direction thereof may be maintained in the second rotational direction, and as the second light 372*a* is reflected by the second mirror 332, the rotational direction of the second reflected light 372*b* may be changed from the second rotational direction (e.g., the right circular direction) to the first rotational direction (e.g., the left circular direction) of the second light 372*a*.

According to various embodiments, according to the illustrated structures of the first mirror 331 and the second mirror 332, at least a portion 371*b* of the first reflected light and at least a portion (e.g., about 50%) of the second reflected light 372*b* may be input to the flat lens 340.

According to various embodiments, the flat lens 340 may cause the light that passed through the flat lens 340 to have a positive focal distance (f>0) when the rotational direction of the input circularly polarized light is the first rotational direction, and cause the light that passed through the flat lens 340 to have a negative focal distance (f<0) when the rotational direction of the input circularly polarized light is the second rotational direction. For example, the flat lens 340 may function as a concave lens and a convex lens according to the rotational direction of the input polarized light, and in more detail, may cause the input right circularly polarized light to have a negative focal distance as in a concave lens and cause the left polarized light to have a positive focal distance as in a convex lens. According to various embodiments, whether to cause the flat lens 340 to have a positive focal distance or a negative focal distance according to the rotational direction (the left circular direction or the right circular direction) of the circularly polarized light is an optional item, and although it has been described in the disclosure that the flat lens 340 has a positive focal distance for the circularly polarized light in the left circular direction (or the first rotational direction) and has a negative focal distance for the circularly polarized light in the right circular direction (or the second rotational direction), an opposite case is possible.

According to various embodiments, the flat lens 340 may simultaneously transmit the circularly polarized lights (e.g., the first reflected light and the second reflected light) of different rotational directions.

The detailed features of the flat lens 340 will be described in detail with reference to FIG. 4.

According to various embodiments, the first light (or at least a portion 371*c* of the first reflected light) and the second reflected light 372*b* (or at least a portion 372 of the second reflected light) may be input to the flat lens 340, the flat lens 340 may form a first focus corresponding to the first reflected light 371*c* at a location (e.g., in a direction that is opposite to the first direction from the flat lens 340) before the first reflected light 371*c* passes through the flat lens 340 and form a second focus corresponding to the second reflected light 372*b* at a location (in the first direction from the flat lens 340) after the second reflected light 372*b* passes through the flat lens 340.

As described above, the first reflected light is reflected by the first mirror 331 and is changed from the first rotational direction (or the left circular direction) to the second rotational direction (or the right circular direction) of the first light 371*a*, and the flat lens 340 is configured to have a negative focal distance for the circularly polarized light in the second rotational direction, and thus may form an image for the first reflected light 371*c* as in a concave lens. Accordingly, when compared with the case in which the flat lens 340 is not used (e.g., FIG. 5), the image of the first reflected light 371*c*, which is recognized by the user, may be formed at a site that is closer to the first direction.

In addition, the second reflected light is reflected by the second mirror 332 and is changed from the second rotational direction (or the right circular direction) to the first rotational direction (or the left circular direction) of the second light 372*a*, and the flat lens 340 is configured to have a positive focal distance for the circularly polarized light in the first rotational direction, and thus may form an image for the second reflected light 372*b* as in a convex lens. Accordingly, when compared with the case in which the flat lens 340 is not used (e.g., FIG. 5), the image of the second reflected light 372*b*, which is recognized by the user, may be formed at a site that is farther from a direction that is opposite to the first direction.

This will be described in more detail with reference to FIGS. 6A to 6D.

Figure 4:
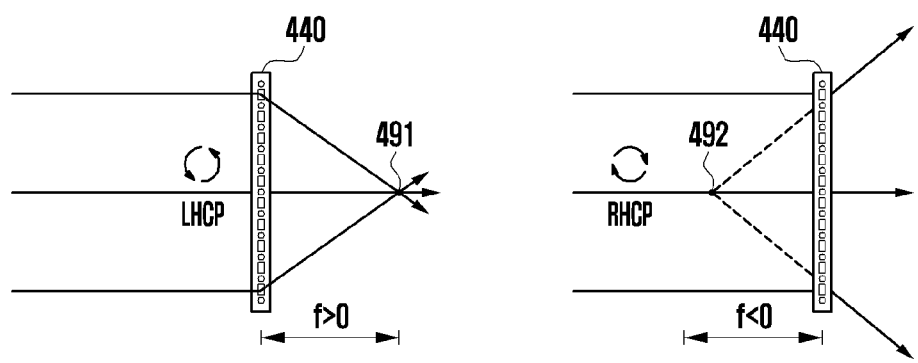
FIG. 4 illustrates optical characteristics of a flat lens of an electronic device according to various embodiments.

FIG. 4 illustrates optical characteristics of a flat lens 440 of an electronic device according to various embodiments.

According to various embodiments, the flat lens 440 may be a polarization directed flat lens (PDFL). Unlike a general lens (e.g., a convex lens and/or a concave lens), in spite of its flat configuration, the PDFL may have different focal distances according to the rotational direction of the input circularly polarized light.

Referring to the left side of FIG. 4, when the input circularly polarized light is in the left circular direction (or the first rotational direction), the flat lens 440 may form a focus at a location 491 after the circularly polarized light passes through the flat lens 440 as in the convex lens. That is, the flat lens 440 may have a positive focal lens. Accordingly, the focus may be formed at a site that is farther from the user than in the case in which a general flat lens 440 is used.

Referring to the right side of FIG. 4, when the input circularly polarized light is in the right circular direction (or the second rotational direction), the flat lens 440 may form a focus at a location 492 before the circularly polarized light passes through the flat lens 440 as in the concave lens. That is, the flat lens 440 may have a negative focal lens. Accordingly, the focus may be formed at a site that is closer to the user than in the case in which a general flat lens 440 is used.

According to various embodiments, the flat lens 440 may have different properties according to a surface, to which the circularly polarized light is input. For example, when the circularly polarized light in the left circular direction (or the first rotational direction) is input to a first surface (the left surface) of the flat lens 440, a focus as in a convex lens may be formed for the left circular polarized light as in FIG. 4, and to the contrary, when the circularly polarized light in the left circular direction (or the first rotational direction) is input to a second surface (the right surface), a focus as in a concave lens may be formed for the left circular polarized light. In addition, when the circularly polarized light in the right circular direction (or the second rotational direction) is input to the first surface (the left surface) of the flat lens 440, a focus as in a concave lens may be formed for the right circular polarized light as in FIG. 4, and to the contrary, when the circularly polarized light in the right circular direction (or the second rotational direction) is input to the second surface (the right surface), a focus as in a convex lens may be formed for the right circular polarized light. The properties of the flat lens 440, by which a focus is formed according to the incident surface of the flat lens 440 and the direction of the circularly polarized light are simple examples, and different designs may be made according to the configuration and the disposition of the flat lens 440.

The flat lens 440 may simultaneously transmit the left circular polarized light and the right circular polarized light, and when the left circular polarized light (e.g., the second reflected light) and the right circular polarized light (e.g., the first reflected light) are simultaneously input to the flat lens 440, the circularly polarized lights may have different focal distances. Accordingly, the user may view images formed at different locations at the same time by using the flat lens 440.

Figure 5A:
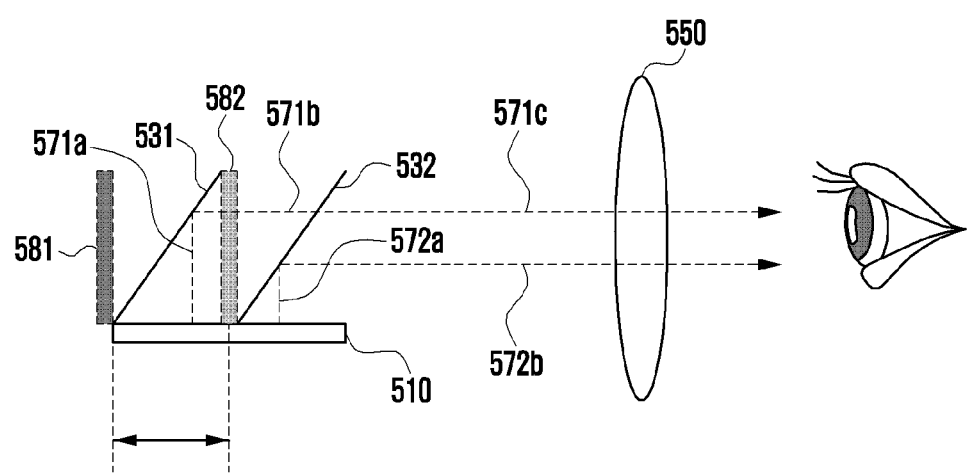
FIGS. 5A and 5B illustrate optical paths and the locations of images of an electronic device according to a comparative example.
Figure 5B:
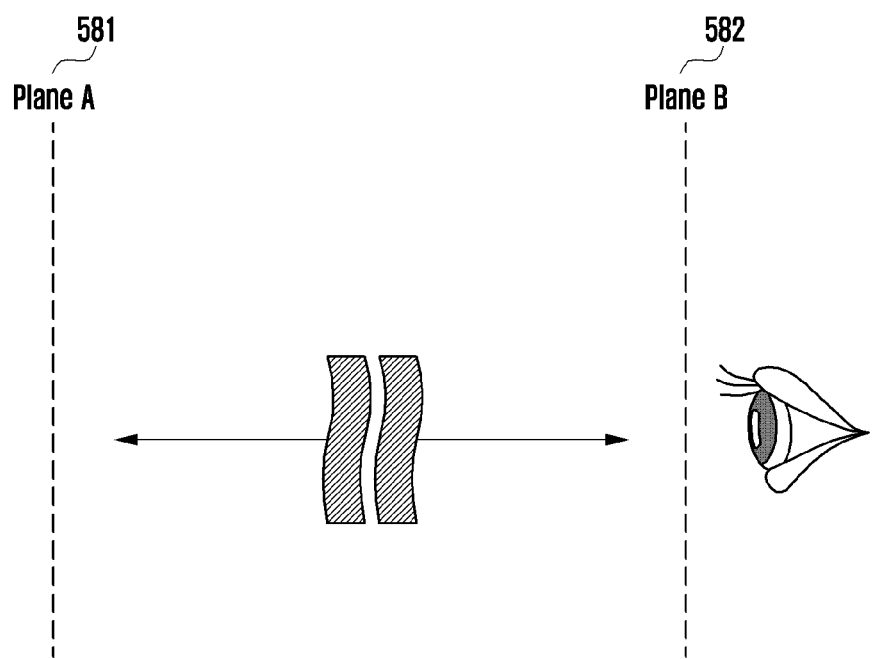

FIGS. 5A and 5B illustrate optical paths and the locations of images of an electronic device according to a comparative example.

FIGS. 5A and 5B illustrate the locations of an image formed by a first light 571a output from a first pixel area and an image formed by a second light 572a output from a second pixel area when a flat lens (e.g., the flat lens 340 of FIG. 3) is not used. Hereinafter, although FIGS. 5A and 5B illustrate comparative examples for various embodiments of the disclosure, FIGS. 5A and 5B are devised by the inventor(s) to deduce the disclosures of various embodiments disclosed in the disclosure, and should not be understood as the prior art. In FIG. 5A, the configurations, except for the flat lens, may be the same as those of FIG. 3.

Referring to FIG. 5A, the first light 571a output from a first pixel area of the display 510 may be reflected as a first reflected light 571b by a first mirror 531 via the first polarizer 521, and at least a portion 571c of the first reflected light may pass through a second mirror 532 and be input to a magnifier 550. Further, at least a portion of the second light 572a output from a second pixel area of the display 510 may be reflected by the second mirror 532 via a second polarizer 522, and the second reflected light 572b may be input to the magnifier 550.

The user may view (at least a portion of) the first reflected light 571c and the second reflected light 572b magnified through the magnifier 550. A first image 581 formed by the first reflected light 571c may be formed at an end (e.g., a corner of the first polarizer 521, which is far from the user) of the first polarizer 521, and a second image 581 formed by the second reflected light 572b may be formed at an end (e.g., a corner of the second polarizer 522, which is far from the user) of the second polarizer 522.

In this case, the distance between the first image 581 and the second image 582 is essentially long. Referring to FIG. 5B, when a virtual reality or an augmented reality is realized through the electronic device, some objects of the second image 582 are essentially viewed immediately in front of the user, and some objects of the first image 581 are essentially viewed at a very far site.

In more detail, when the sizes of the first pixel area and the second pixel area are set to the same in a display of 0.7 inch, a focal distance of the magnifier 550 is set to 40 mm, and a distance between the magnifier 550 and the display 510 is set to 24 mm, the distance between an eye and the location, at which the first image 581 is formed, is 3160 mm and the distance between the eye and the location, at which the second image 582 is formed, is 153 mm, which are measured to be very large values.

According to various embodiments, a distance between the first image 581 and the second image 582 may be determined to be shorter than in the comparative examples of FIGS. 5A and 5B, through the structure of FIG. 3.

FIGS. 6A to 6D illustrate optical paths and the locations of images of an electronic device according to various embodiments.

Figure 6A:
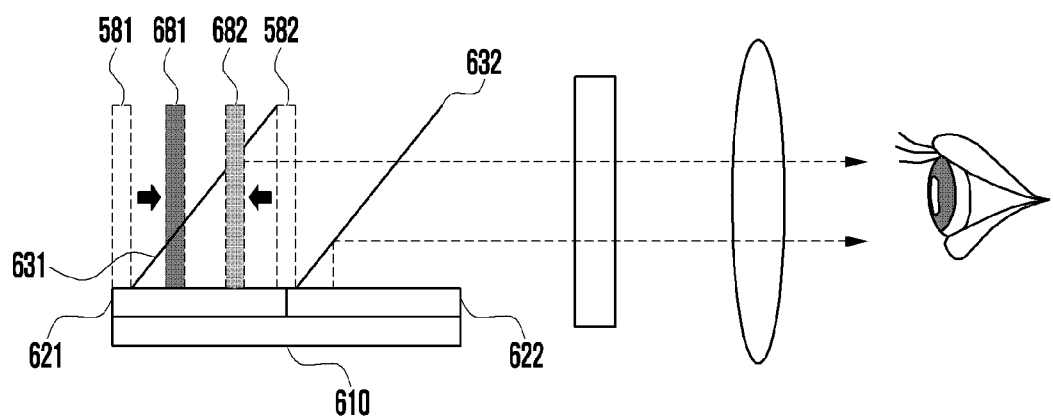
FIGS. 6A, 6B, 6C, and 6D illustrate optical paths and the locations of images of an electronic device according to various embodiments.

The embodiment of FIG. 6A is different from the comparative example of FIG. 5A in that the flat lens is disposed between the second mirror and the magnifier.

Referring to FIG. 6A, the first light output from the first pixel area of the display 610 may be changed to a circularly polarized light in the first rotational direction via the first polarizer 621, may be input to the first mirror 631, and may be substantially totally reflected by the first mirror 631, and the first reflected light in the second rotational direction may be input to the second mirror 632. The second mirror 632 may be realized as a half mirror or a beam splitter, and at least a portion (e.g., about 50%) of the first reflected light may pass through the second mirror 632 and be input to the flat lens 640. In addition, the second light output from the second pixel area of the display 610 may be changed to a circularly polarized light in the second rotational direction via the second polarizer 622 and may be input to the second mirror 632, and at least a portion (e.g., about 50%) of the second light may be reflected by the second mirror 632, and the second reflected light in the first rotational direction may be input to the second mirror 632.

According to various embodiments, the flat lens 640 may cause the light that passed through the flat lens 640 to have a positive focal distance (f>0) when the rotational direction of the input circularly polarized light is the first rotational direction, and cause the light that passed through the flat lens 640 to have a negative focal distance (f<0) when the rotational direction of the input circularly polarized light is the second rotational direction.

According to various embodiments, the first reflected light in the second rotational direction may have a negative focal distance, the second reflected light in the first rotational direction may have a positive focal distance, the first image 681 formed by the first reflected light may be disposed on a side that is closer to the user than the first image 581 when the flat lens 640 is not used (e.g., FIG. 5A), and the second image 682 may be disposed on a side that is far from the user as compared with the second image 582 when the flat lens 640 is not used.

Accordingly, the location of the first image 681 and the location of the second image 682 may become closer, and for example, the first image 681 and the second image 682 may be disposed on a first area (or the first pixel area and the location of the first polarizer 621).

Figure 6B:
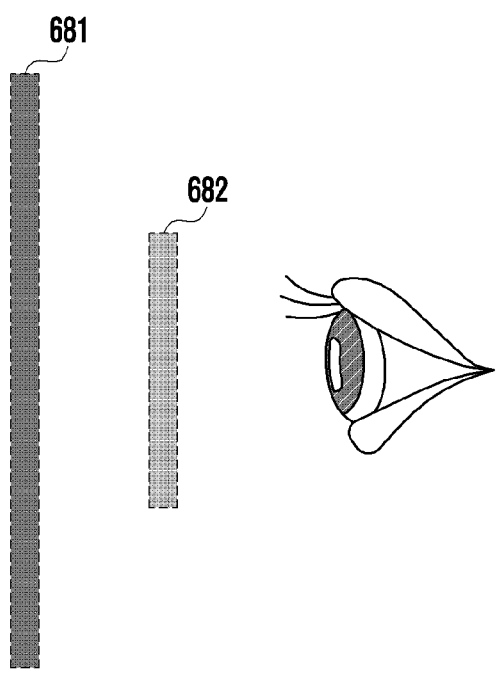

According to the embodiment of FIG. 6A, referring to FIG. 6B, the user may view the objects of the first image 681 and the second image 682 at closer locations than in FIG. 5B.

Figure 6C:
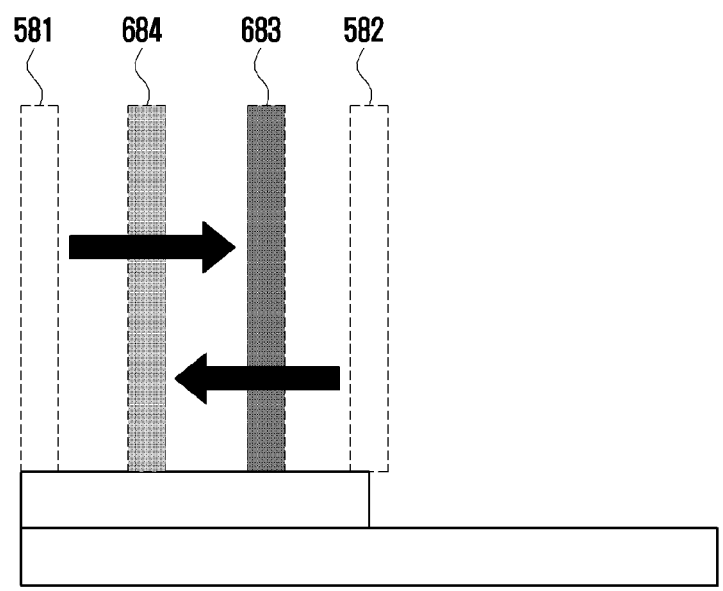

As compared with FIG. 6A, FIG. 6C illustrates an embodiment, in which the display (e.g., the display 610 of FIG. 6A), the polarizer (e.g., the first polarizer 621 and the second polarizer 622 of FIG. 6A), and the mirror (e.g., the first mirror 631 and the second mirror 632 of FIG. 6A) are the same but a flat lens having a longer focal distance is used. As illustrated in FIG. 6A, the first image 683 formed by the first reflected light may be formed at a side that is closer to the user, and the second image 684 may be formed at a side that is farther from the user. Accordingly, the first image 683 may be formed on a side that is closer to the user than the second image 684.

Figure 6D:
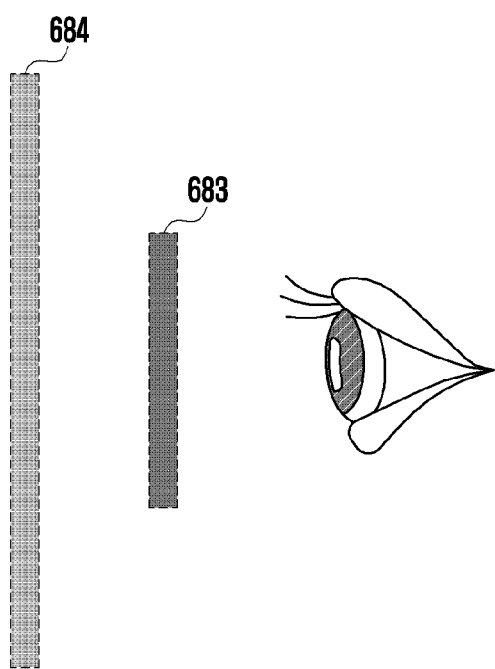

Referring to FIG. 6D, the user may view the first image 693 at a closer location than the second image 684.

Figure 7:
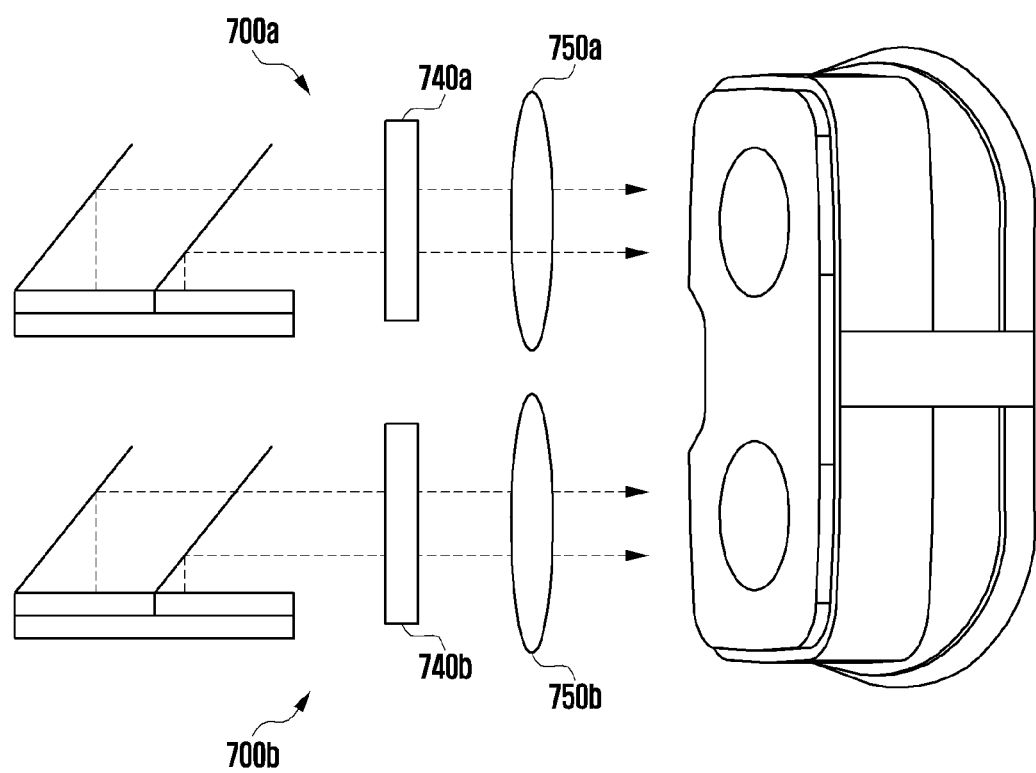
FIG. 7 illustrates an optical path when an electronic device is realized as a virtual reality device according to various embodiments.

FIG. 7 illustrates an optical path when an electronic device is realized as a virtual reality device according to various embodiments.

According to various embodiments, the electronic device may be realized as a head mounted display device, and may provide a virtual reality function through a head mounted display device.

Because an image has to be provided to both eyes of the user to provide a virtual reality, the structure of FIG. 3 may be provided to both eyes of the user (700a and 700b). The electronic device may include a magnifier disposed in a light travel direction from flat lenses 740a and 740b, and magnifiers 750a and 750b may be disposed to correspond to the locations of the eyes.

Figure 8:
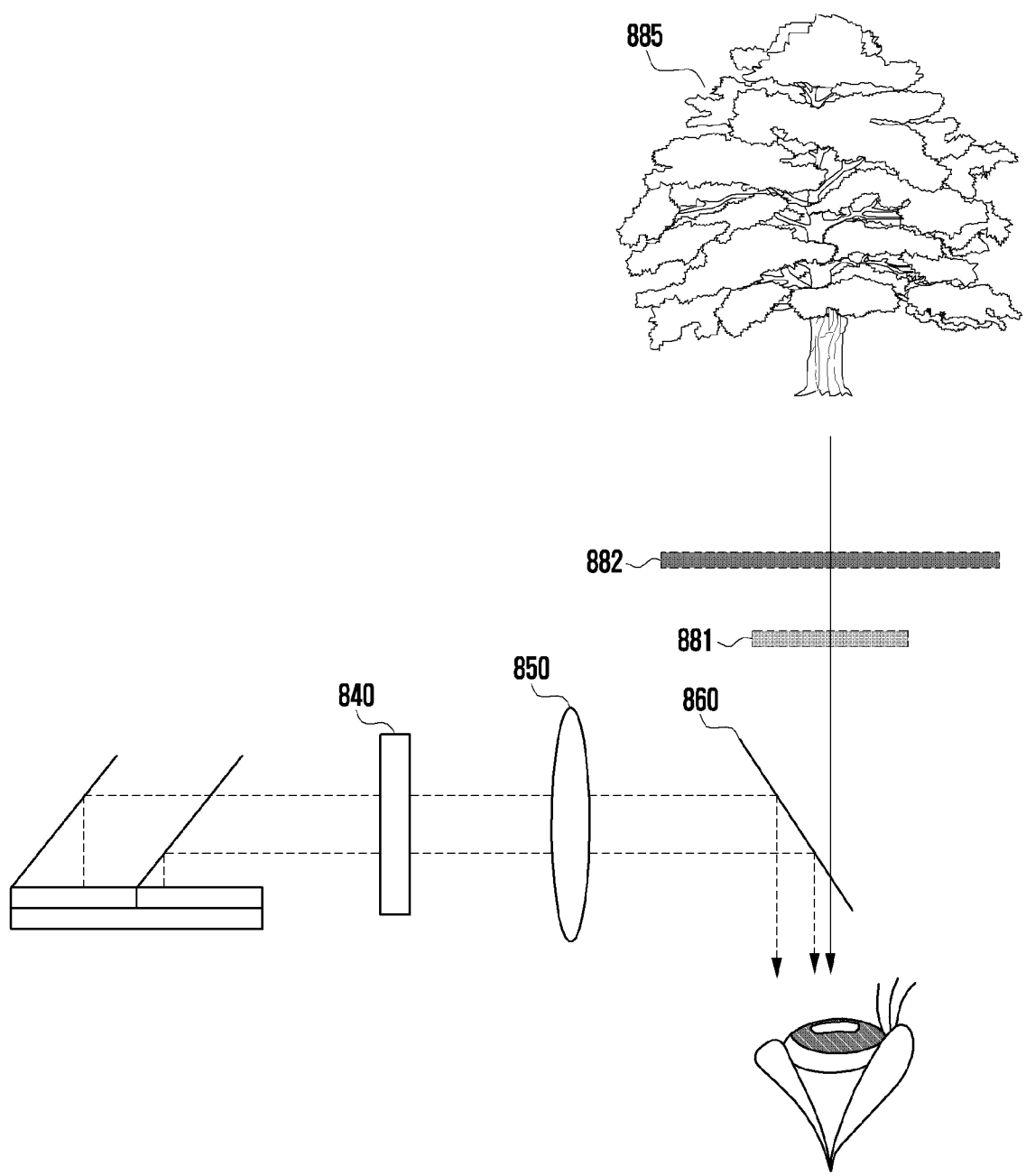
FIG. 8 illustrates an optical path when an electronic device is realized as an augmented reality device according to various embodiments.

FIG. 8 illustrates an optical path when an electronic device is realized as an augmented reality device according to various embodiments.

According to various embodiments, the electronic device may be realized as a head mounted display device, and may provide an augmented reality function through a head mounted display device.

As compared with a virtual reality function, according to the augmented reality function, a real scene has to be viewed together with an augmented image provided by a display.

According to various embodiments, the electronic device may include a fourth mirror 860 configured to reflect the light that passed through the flat lens 840 and the magnifier 850 substantially in a vertical direction. Accordingly, because the structures of the display, the mirror, the flat lens 840, the magnifier 850, and the like may be disposed in a direction (e.g., a downward direction when the electronic device is mounted) that is perpendicular to the eye of the user, the user may view a real scene 885 and augmented images 881 and 882 at the same time.

FIGS. 9 and 10A to 10D illustrate optical paths and the locations of images of an electronic device according to various embodiments.

Unlike the embodiments of FIGS. 3 to 8, FIGS. 9, and 10A to 10D relate to an embodiment in which three images are formed by using three polarizers.

According to various embodiments, the electronic device may further include a third polarizer 923 disposed on a third area of the display 910, and configured to rotate a third light 973a output through one or more third pixels included in the third area in a first rotational direction or a second rotational direction, and a third mirror 933 disposed on the third area at a third inclination, and configured to reflect at least a portion of the third image 973a. Accordingly, the electronic device may form image of three areas of the display 910 at different locations.

Figure 9:
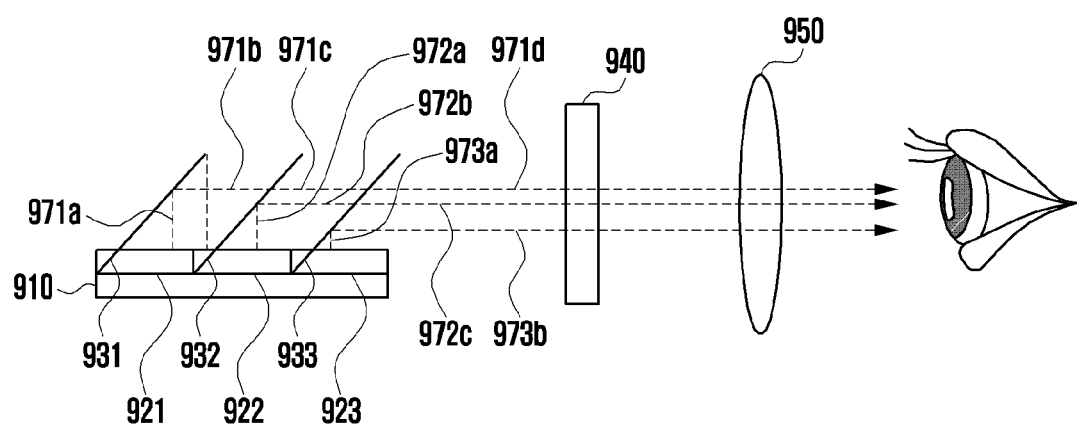
FIGS. 9, 10A, 10B, 10C, and 10D illustrate optical paths and the locations 5 of images of an electronic device according to various embodiments.

Referring to FIG. 9, three polarizers 921, 922, and 923 may be disposed on a display 910 (e.g., the display 310 of FIG. 3 or the display of the external electronic device) of the electronic device. As illustrated, the first polarizer 921, the second polarizer 922, and the third polarizer 923 may be disposed sequentially from a side (a direction that is opposite to the first direction) that is far from the flat lens 940. The sizes of the first to third polarizers 921 to 923 may be the same, but the sizes of some of the first to third polarizers 921 to 923 may be different. The first to third polarizers 921 to 923 may be disposed on the first to third pixels, among the plurality of pixels of the display 910.

According to various embodiments, a first mirror 931 may be disposed on the first polarizer 921, a second mirror 932 may be disposed on the second polarizer 922, and a third mirror 933 may be disposed on the third polarizer 923. The first to third mirrors 931 to 933 may be disposed at the same inclination as the first to third polarizers 921 to 923.

According to various embodiments, the first polarizer 921 may rotate a first light 971a output from the first pixel area of the display 910 in a first rotational direction (e.g., the left circular direction). The first light 971a in the first rotational direction, which passed through the first polarizer 921, may be reflected in the first direction by the first mirror 931, and the first reflected light 971b reflected by the first mirror 931 may be rotated in the second rotational direction (e.g., the right circular direction). The first mirror 931 may reflect the first light 971a substantially totally.

According to various embodiments, the second polarizer 922 may rotate a second light 972a output from the second pixel area of the display 910 in a second rotational direction (e.g., the right circular direction). The second mirror 932 may be realized by a half mirror or a beam splitter that transmits a portion of the light and reflects the remaining portions of the light. Accordingly, a portion (e.g., about 50%) of the second light 972a may be transmitted in the second direction, and the remaining portions (e.g., about 50%) of the second light 972a may be reflected in the first direction by the second reflected light 972b. The rotational direction of the second reflected light 972b may be changed to the first rotational direction as it is reflected along the second mirror 932. The first reflected light 971b reflected by the first mirror 931 may be input to the first surface of the second mirror 932, a portion (e.g., about 50%) of the first reflected light may be reflected in the second direction, and the remaining portions of the first reflected light may pass through the second mirror 932. Accordingly, a portion 971c of the first reflected light and a portion 972b of the second reflected light may be input from the second mirror in the first direction.

According to various embodiments, the third polarizer 923 may rotate a third light 973a output from the third pixel area of the display 910 in a first rotational direction (e.g., the left circular direction) or a second rotational direction (e.g., the right circular direction). Although FIG. 9 illustrates an embodiment, in which the third polarizer 923 rotates the third light 973a in the second rotational direction.

According to various embodiments, the third mirror 933 may be realized as a half mirror or a beam splitter, and the ratio of transmission to reflection may be about 2:1, but the disclosure is not limited thereto. A portion 971c of the first reflected light that passed through the second mirror 932 and a portion 972b of the second reflected light reflected by the second mirror 932 may be input to a second surface (e.g., a surface of the third mirror 933, which is opposite to a surface facing the third polarizer 923) of the third mirror 933. Portions (e.g., about 17%) of the first reflected light and the second reflected light may be reflected in the second direction, and the remaining portions (e.g., about 33%) 971d and 972c may pass through the third mirror 933 and be input to the flat lens 940. Further, the third polarizer 923 may reflect a portion (e.g., about 33%) of the third light 973a in the first direction as a third reflected light 973b, and the remaining portions (e.g., about 67%) may be transmitted in the second direction. As the third image 973a is reflected by the third mirror 933, the rotational direction of the third reflected light 973b may be changed to the first rotational direction.

According to the above structure, a portion (e.g., 113%) 971d of the first reflected light in the second rotational direction, a portion (e.g., 113%) 972c of the second reflected light in the first rotational direction, and a portion (e.g., 113%) 973b of the third reflected light in the first rotational direction may be input to the flat lens 940.

According to various embodiments, the flat lens 940 may cause the light that passed through the flat lens 940 to have a positive focal distance (f>0) when the rotational direction of the input circularly polarized light is the first rotational direction, and cause the light that passed through the flat lens 940 to have a negative focal distance (f<0) when the rotational direction of the input circularly polarized light is the second rotational direction.

According to various embodiments, the flat lens 940 may form a first focus corresponding to the first reflected light 971d at a location (e.g., a direction that is opposite to the first direction from the flat lens 940) before the first reflected light 971d passes through the flat lens 940, form a second focus corresponding to the second reflected light 972c at a location (e.g., the first direction from the flat lens 940) after the second reflected light 972c passes through the flat lens 940, and form a second focus corresponding to the third reflected light 973b at a location (e.g., the first direction from the flat lens 940) after the third reflected light 973b passes through the flat lens 940. In FIG. 9, the third focus has a positive focal distance as the third polarizer 923 rotates the third light 973a in the second rotational direction that is the same as in the second polarizer 922, but unlike this, the third focus may have a negative focal distance when the third polarizer 923 rotates the third light 973a in the first rotational direction that is the same as in the first polarizer 921.

Figure 10A:
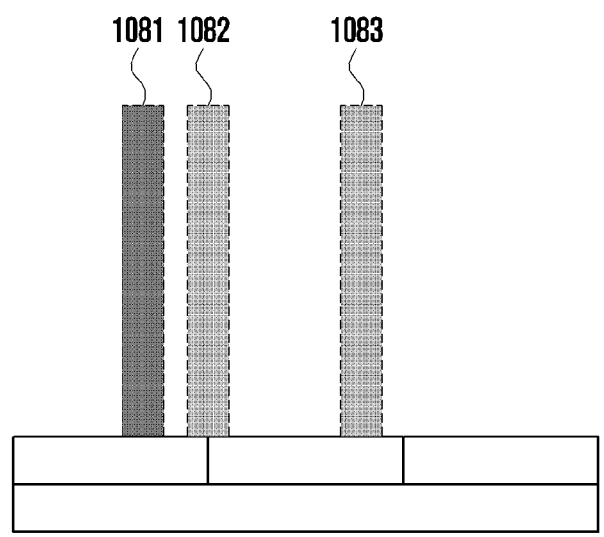
Figure 10B:
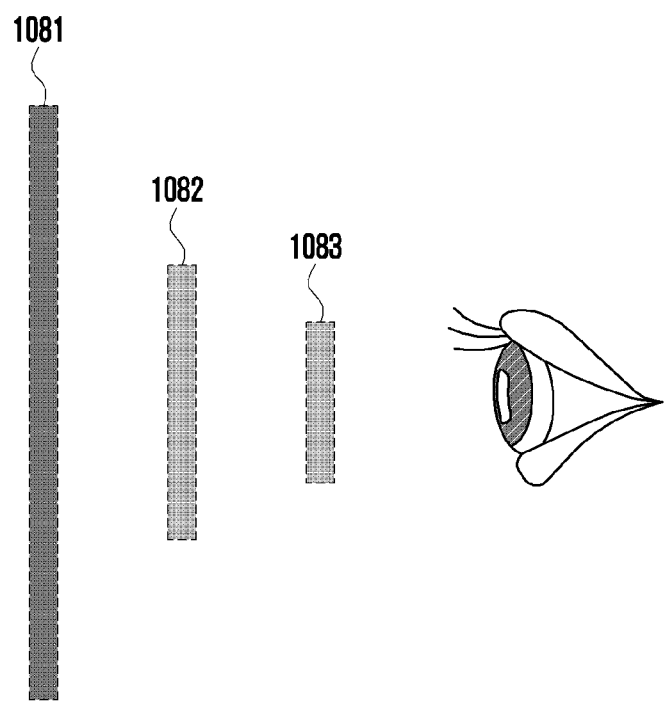

FIGS. 10A and 10B illustrate locations of images formed by first to third light according to the structure of FIG. 9.

Referring to FIG. 10A, because the first reflected light has a negative focal distance, a first image 1081 formed by the first reflected light may be formed on a side that is closer to the user than a location (e.g., a corner of the first polarizer that is far from the user) of an image formed when a flat lens (e.g., the flat lens 940 of FIG. 9) is not included. Further, because the second reflected light and the third reflected light have positive focal distances, a second image 1082 and a third image 1083 may be formed on a side that is farther from the user than a location (e.g., a corner of the second polarizer that is far from the user and a corner of the second polarizer that is far from the user) of an image formed when a flat lens is not included Accordingly, referring to FIG. 6B, the user may view the first image 1081, the second image 1082, and the third image 1083 sequentially from a remote location, and the location of the first image 1081 and the locations of the second image 1082 and the third image 1083 may become closer.

Figure 10C:
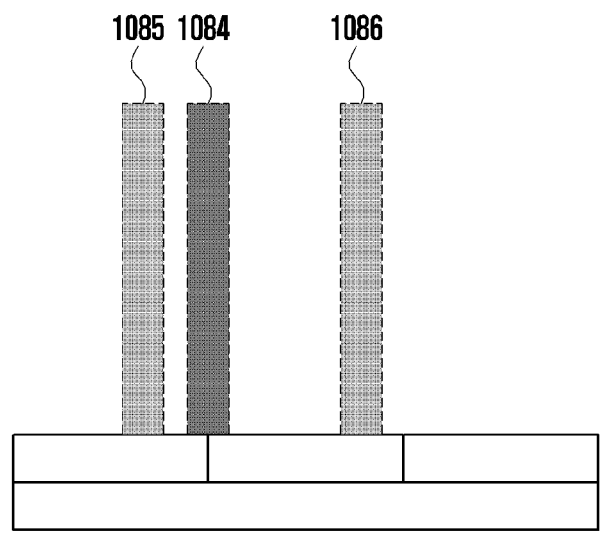
Figure 10D:
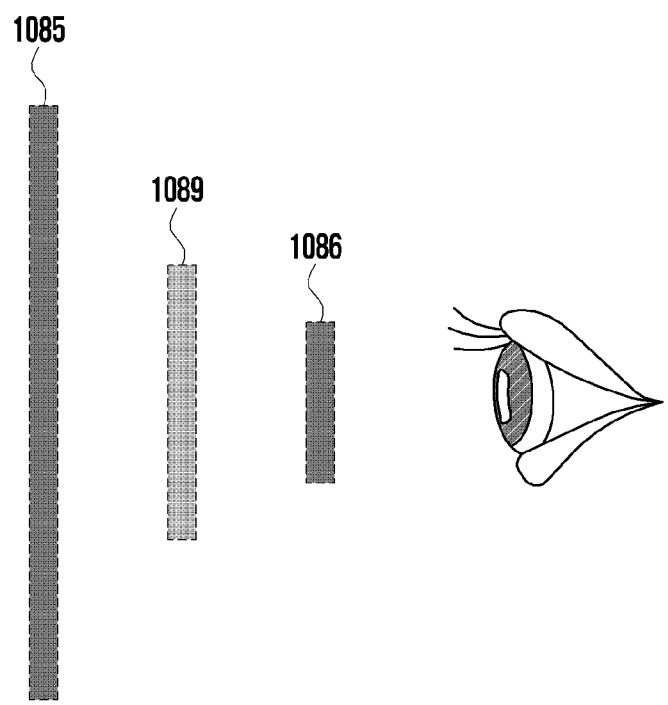

FIG. 10C illustrates an embodiment, in which the display, the polarizer, and the mirror are the same and a flat lens having a longer focal distance is used than in FIG. 10A. As illustrated in FIG. 10C, the first image 1084 formed by the first reflected light may be formed at a side that is closer to the user, and the second image 1085 and the third image 1086 may be formed at a side that is farther from the user. Accordingly, referring to FIG. 10D, the user may view the second image 1085, the first image 1084, and the third image 1086 sequentially from a remote location.

FIG. 11 illustrates a block diagram of an electronic device that may provide multiple focuses for light output from a display, in a network environment, according to various embodiments.

Referring to FIG. 11, in a network environment 1100, an electronic device 1101 may communicate an electronic device 1102 through a first network 1198 (e.g., a near field wireless communication), or may communicate with an electronic device 1104 or a server 1108 through a second network 1199 (e.g., a long distance wireless communication). According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, and an antenna module 1197. In some embodiments, at least one (e.g., the display device 1160 or the camera module 1180) of the elements may be omitted from the electronic device 1101 or other elements may be added. In some embodiments, for example, as in the sensor module 1176 (e.g., a fingerprint sensor, an iris sensor, or an illumination sensor) embedded in the display device 1160 (e.g., a display), some elements may be integrated to be implemented.

The processor 1120, for example, may control at least one element (e.g., a hardware or software element) of the electronic device 1101 connected to the processor 1120 by driving software (e.g., a program 1140), and may perform various data processing and calculations. The processor 1120 may load commands or data received from another element (e.g., the sensor module 1176 or the communication module 1190) in a volatile memory 332 and process the commands or data, and may store result data in a nonvolatile memory 1134. According to an embodiment, the processor 1120 may include a main processor 1121 (e.g., a central processing device or an application processor), and an auxiliary processor 1123 (e.g., a graphic processing device, an image signal processor, a sensor hub processor, or a communication processor) which may be operated independently from the main processor 1121, may use electric power that is lower than that of the main processor 1121 additionally or alternatively, or may be specified for a specific function. The auxiliary processor 1123 may be operated separately from the main processor 1121 or while being embedded in the main processor 1121.

The auxiliary processor 1123, for example, may control at least some of functions or states related to at least one element (e.g., the display device 1160, the sensor module 1176, or the communication module 1190) of the elements of the electronic device 1101 in replacement of the main processor 1121 while the main processor 1121 is in an inactive (e.g., sleep) state, or together with the main processor 1121 while the main processor 1121 is in an active (e.g., application execution) state. According to an embodiment, the auxiliary processor 1123 (e.g., an image signal processor or a communication processor) may be implemented as some of other elements (e.g., the camera module 1180 or the communication module 1190) which is functionally relevant. The memory 1130 may store various data, for example, software (e.g., a program 1140) and input data or output data for related commands used by at least one element (e.g., the processor 1120 or the sensor module 1176) of the electronic device 1101. The memory 1130 may include a volatile memory 332 or a nonvolatile memory 1134.

The program 1140, for example, may include an operating system 1142, middleware 1144, or an application 1146 as the software stored in the memory 1130.

The input device 1150 is a device that may receive a command or data, which will be used in an element (e.g., the processor 1120) of the electronic device 1101 from the outside (e.g., the user) of the electronic device 1101, and for example, may include a microphone, a mouse, or a keyboard.

The sound output device 1155 is a device for outputting a sound signal to the outside of the electronic device 1101, and for example, may include speaker used for a general purpose, such as reproduction of multimedia or reproduction of a recorded sound and a receiver used specifically for reception of a call. According to an embodiment, the receiver may be disposed integrally with or separately from the speaker.

The display device 1160 is a device for visually providing information to the user of the electronic device 1101, and for example, may include a display, a hologram device, or a projector, and a control circuit for controlling the corresponding device. According to an embodiment, the display device 1160 may include a touch circuit or a pressure sensor for measuring the intensity of a pressure against a touch.

The audio module 1170 may bilaterally convert a sound and an electrical signal. According to an embodiment, the audio module 1170 may acquire a sound through the input device 1150 or may output a sound through the sound output device 1155 or an external electronic device (e.g., the electronic device 1102) (e.g., a speaker or a headphone) by wire or wirelessly connected to the electronic device 1101.

The sensor module 1176 may generate an electrical signal or a data value corresponding to an operational state (e.g., electric power or a temperature) of the interior of the electronic device 1101 or an environmental state of the outside. The sensor module 1176, for example, may include a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor.

The interface 1177 may support a specific protocol that may be connected to the external electronic device (e.g., the electronic device 1102) by wire or wirelessly. According to an embodiment, the interface 1177 may include a high definition multimedia interface (HDMI), a universal serial bus (USB) interface, an SD card interface, or an audio interface.

A connection terminal 1178 may include a connector, for example, an HDMI connector, a USB connector, an SD card connector, or an audio connector (e.g., a headphone connector), which may physically connect the electronic device 1101 and the external electronic device (e.g., the electronic device 1102).

The haptic module 1179 may convert an electric signal to a mechanical stimulus (e.g., vibration or a motion) or an electrical stimulus that may be recognized by the user through a haptic feeling or a sense of motion. The haptic module 1179, for example, may include a motor, a piezoelectric element, or an electrical stimulus device.

The camera module 1180 may capture a still image or a video. According to an embodiment, the camera module 1180 may include one or more lenses, image sensors, image signal processors, or flashes.

The power management module 1188 is a module for managing electric power supplied to the electronic device 1101, and for example, may be constituted as at least a part of a power management integrated circuit (PMIC).

The battery 1189 is a device for supplying electric power to at least one component of the electronic device 1101, and for example, may include a primary battery that cannot be recharged, a secondary battery that may be recharged, or a fuel cell.

The communication module 1190 may support establishment of a wired or wireless communication channel between the electronic device 1101 and the external electronic device (e.g., the electronic device 1102, the electronic device 1104, or the server 1108), and execution of communication through the established communication channel. The communication module 1190 may include one or more communication processors that is operated independently from the processor 1120 (e.g., an application processor) and supports wired communication or wireless communication. According to an embodiment, the communication module 1190 may include a wireless communication module (e.g., a cellular communication module, a short rage wireless communication module, or a global navigation satellite system (GNSS) communication module) or a wired communication module 1194 (e.g., a local area network (LAN) communication module or a power line communication module), and may communicate with the external electronic device through a first network 1198 (e.g., a short range communication network such as Bluetooth, Wi-Fi direct, or infrared data association (IrDA)) or a second network 1199 (e.g., a long distance communication network such as a cellular network, the internet, or a computer network (e.g., LAN or WAN)) by using a communication module corresponding thereto. The various kinds of communication modules 1190, which have been described above, may be implemented by one chip or may be implemented by separate chips, respectively.

According to an embodiment, the wireless communication module 1192 may distinguish and authenticate the electronic device 1101 in a communication network by using user information stored in the subscriber identification module 1196.

The antenna module 1197 may include one or more antennas for transmitting a signal or electric power to the outside or receiving a signal or electric power from the outside. According to an embodiment, the communication module 1190 (e.g., the wireless communication module 1192) may transmit a signal to an external electronic device or receive a signal from an external electronic device, through an antenna that is suitable for a communication scheme.

Some of the elements may be connected to each other through a communication scheme (e.g., a bus, a general purpose input and output (GPIO), a serial peripheral interface (SPI), or a mobile industry processor interface (MIPI)) between peripheral devices, and may exchange signals (e.g., a command or data).

According to an embodiment, a command or data may be transmitted or received between the electronic device 1101 and the external electronic device 1104 through the server 1108 connected to the second network 1199. The electronic device 1102 or 1104 may be a device that is the same as or different from the electronic device 1101. According to various embodiments of the disclosure, all or some of the operations executed by the electronic device 1101 may be executed by another or a plurality of electronic devices. According to an embodiment of the disclosure, when the electronic device 1101 should execute some functions or services automatically or upon request, it may request at least some functions associated with the functions or services from an external electronic device, in place of or in addition to directly executing the functions or services. The external electronic device, which has received the request, may execute a requested function or an additional function, and may deliver the result to the electronic device 1101. The electronic device 1101 may process the received result directly or additionally, and may provide a requested function or service. To this end, for example, the cloud computing, distributed computing, or client-server computing technologies may be used.

An electronic device 100 according to various embodiments may include a display 310 including a plurality of pixels, a first polarizer 321 disposed on a first area of the display 310 and configured to rotate a first light output through one or more first pixels pertaining to the first area in a first rotational direction, a second polarizer 322 disposed on a second area of the display 310 and configured to rotate a second light output through one or more second pixels pertaining to the second area in a second rotational direction, a first mirror 331 disposed on the first area at a first inclination and configured to reflect the first light that rotates in the first rotational direction, a second mirror 332 disposed on the second area at a second inclination and configured to reflect at least a portion of the second light that rotates in the second rotational direction, and a flat lens 340 configured to transmit a first reflected light obtained by reflecting the first light that rotates in the first rotational direction, on the first mirror 331, and a second reflected light obtained by reflecting the second light that rotates in the second rotational direction, on the second mirror 332, wherein the flat lens 340 forms a first focus corresponding to the first reflected light at a location before the first reflected light passes through the flat lens 340, and forms a second focus corresponding to the second reflected light at a location after the second reflected light passes through the flat lens 340.

According to various embodiments, the flat lens 340 may cause the light that passed through the flat lens 340 to have a negative focal distance when the rotational direction of an input circularly polarized light is the first rotational direction, and may cause the light that passed through the flat lens 340 to have a positive focal distance when the rotational direction of the input circularly polarized light is the second rotational direction.

According to various embodiments, the flat lens 340 may simultaneously transmits at least portions of the first reflected light and the second reflected light.

According to various embodiments, a first image formed by the first light and a second image formed by the second light may be disposed on the first area.

According to various embodiments, the first mirror 331 may be disposed at a location that is farther from the flat lens 340 than the second mirror 332 such that the first reflected light is input to the second mirror 332.

According to various embodiments, the second mirror 332 may transmit at least a portion of the first reflected light such that the at least a portion of the first reflected light is input to the flat lens 340, and reflects at least a portion of the remainder of the first reflected light in a direction from the second polarizer 322.

According to various embodiments, the second mirror 332 may reflect at least a portion of the second light such that the second reflected light is input to the flat lens, and transmits the remaining portions of the second light.

According to various embodiments, the first inclination and the second inclination may be substantially the same.

According to various embodiments, the electronic device may further include a third polarizer disposed on a third area of the display 310 and configured to rotate a third light output through one or more third pixels pertaining to the third area in the first rotational direction or the second rotational direction, and a third mirror 933 disposed on the third area at a third inclination and configured to reflect at least a portion of the third light.

According to various embodiments, the flat lens 340 may form a third focus corresponding to the third reflected light at a location before or after the third reflected light passes through the flat lens 340.

According to various embodiments, the third mirror 933 may transmit at least a portion of the first reflected light and the second reflected light and inputs the at least a portion of the first reflected light and the second reflected light to the flat lens 340, and may reflect at least a portion of the remainder of the first reflected light and the second reflected light in a direction different from the third polarizer.

According to various embodiments, the electronic device may further include a magnifier disposed in a light travel direction from the flat lens 340.

According to various embodiments, the electronic device may further include a fourth mirror 860 configured to reflect the light that passed through the flat lens 340 in a substantially vertical direction.

According to various embodiments, the electronic device 100 may be a head mounted display device 310.

An electronic device 100 according to various embodiments may include an accommodation part accommodating an external electronic device 100, a first polarizer 321 disposed on a first area of the external electronic device 100 and configured to rotate a first light output through one or more first pixels pertaining to the first area in a first direction, a second polarizer 322 disposed on a second area of the external electronic device 100 and configured to rotate a second light output through one or more second pixels pertaining to the second area in a second direction, a first mirror 331 disposed on the first area at a first inclination and configured to reflect the first light that rotates in the first direction, a second mirror 332 disposed on the second area at a second inclination and configured to reflect the second light that rotates in the second direction, and a flat lens 340 configured to transmit a first reflected light obtained by reflecting the first light that rotates in the first direction, on the first mirror 331, and a second reflected light obtained by reflecting the second light that rotates in the second direction, on the second mirror 332, wherein the flat lens 340 forms a first focus corresponding to the first reflected light at a location after the first reflected light passes through the flat lens 340, and forms a second focus corresponding to the second reflected light at a location before the second reflected light passes through the flat lens 340.

According to various embodiments, At least a portion of the first area of the external electronic device 100 or the second area of the external electronic device 100 may include at least a portion of the display 310 of the external electronic device 100.

According to various embodiments, the flat lens 340 may cause the light that passed through the flat lens 340 to have a negative focal distance when the rotational direction of an input circularly polarized light is the first rotational direction, and causes the light that passed through the flat lens 340 to have a positive focal distance when the rotational direction of the input circularly polarized light is the second rotational direction.

According to various embodiments, the flat lens 340 may simultaneously transmits at least portions of the first reflected light and the second reflected light.

According to various embodiments, a first image formed by the first light and a second image formed by the second light may be disposed on the first area.

What is claimed is:

1. An electronic device comprising:
   a display comprising a plurality of pixels;
   a first polarizer disposed on a first area of the display and configured to rotate a first light output through one or more first pixels pertaining to the first area in a first rotational direction;
   a second polarizer disposed on a second area of the display and configured to rotate a second light output through one or more second pixels pertaining to the second area in a second rotational direction;
   a first mirror disposed on the first area at a first inclination and configured to reflect the first light that rotates in the first rotational direction;

a second mirror disposed on the second area at a second inclination and configured to reflect at least a portion of the second light that rotates in the second rotational direction; and a flat lens configured to transmit a first reflected light obtained by reflecting the first light that rotates in the first rotational direction, on the first mirror, and a second reflected light obtained by reflecting the second light that rotates in the second rotational direction, on the second mirror, wherein the flat lens forms a first focus corresponding to the first reflected light at a location before the first reflected light passes through the flat lens, and forms a second focus corresponding to the second reflected light at a location after the second reflected light passes through the flat lens.

2. The electronic device of claim 1, wherein the flat lens causes the light that passed through the flat lens to have a negative focal distance when the rotational direction of an input circularly polarized light is the first rotational direction, and causes the light that passed through the flat lens to have a positive focal distance when the rotational direction of the input circularly polarized light is the second rotational direction.

3. The electronic device of claim 1, wherein the flat lens simultaneously transmits at least portions of the first reflected light and the second reflected light.

4. The electronic device of claim 1, wherein a first image formed by the first light and a second image formed by the second light are disposed on the first area.

5. The electronic device of claim 1, wherein the first mirror is disposed at a location that is farther from the flat lens than the second mirror such that the first reflected light is input to the second mirror.

6. The electronic device of claim 1, wherein the second mirror transmits at least a portion of the first reflected light such that the at least a portion of the first reflected light is input to the flat lens, and reflects at least a portion of the remainder of the first reflected light in a direction different from the second polarizer.

7. The electronic device of claim 6, wherein the second mirror reflects at least a portion of the second light such that the second reflected light is input to the flat lens, and transmits at least a portion of the remainder of the second light.

8. The electronic device of claim 1, wherein the first inclination and the second inclination are substantially the same.

9. The electronic device of claim 1, further comprising:
a third polarizer disposed on a third area of the display and configured to rotate a third light output through one or more third pixels pertaining to the third area in the first rotational direction or the second rotational direction; and a third mirror disposed on the third area at a third inclination and configured to reflect at least a portion of the third light.

10. The electronic device of claim 9, wherein the flat lens forms a third focus corresponding to the third reflected light at a location before or after the third reflected light passes through the flat lens.

11. The electronic device of claim 9, wherein the third mirror transmits at least a portion of the first reflected light and the second reflected light and inputs the at least a portion of the first reflected light and the second reflected light to the flat lens, and reflects at least a portion of the remainder of the first reflected light and the second reflected light in a direction from the third polarizer.

12. The electronic device of claim 1, further comprising:
a magnifier disposed in a light travel direction from the flat lens.

13. The electronic device of claim 1, further comprising:
a fourth mirror configured to reflect the light that passed through the flat lens in a substantially vertical direction.

14. The electronic device of claim 1, wherein the electronic device is a head mounted display device.

15. An electronic device comprising:
an accommodation part accommodating an external electronic device;

a first polarizer disposed on a first area of the external electronic device and configured to rotate a first light output through one or more first pixels pertaining to the first area in a first direction;

a second polarizer disposed on a second area of the external electronic device and configured to rotate a second light output through one or more second pixels pertaining to the second area in a second direction;

a first mirror disposed on the first area at a first inclination and configured to reflect the first light that rotates in the first direction;

a second mirror disposed on the second area at a second inclination and configured to reflect the second light that rotates in the second direction; and a flat lens configured to transmit a first reflected light obtained by reflecting the first light that rotates in the first direction, on the first mirror, and a second reflected light obtained by reflecting the second light that rotates in the second direction, on the second mirror, wherein the flat lens forms a first focus corresponding to the first reflected light at a location after the first reflected light passes through the flat lens, and forms a second focus corresponding to the second reflected light at a location before the second reflected light passes through the flat lens.

* * * * *